United States Patent
Kailas

(10) Patent No.: US 7,665,070 B2
(45) Date of Patent: Feb. 16, 2010

(54) METHOD AND APPARATUS FOR A COMPUTING SYSTEM USING META PROGRAM REPRESENTATION

(75) Inventor: Krishnan Kunjunny Kailas, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 10/829,989

(22) Filed: Apr. 23, 2004

(65) Prior Publication Data

US 2005/0240897 A1    Oct. 27, 2005

(51) Int. Cl.
G06F 9/44      (2006.01)
G06F 11/00    (2006.01)

(52) U.S. Cl. .......................... 717/127; 717/130; 714/47

(58) Field of Classification Search .................. 717/127, 717/151, 158; 703/22; 714/39; 713/320, 713/340; 702/189
See application file for complete search history.

(56) References Cited

U.S. PATENT DOCUMENTS

| | | | | |
|---|---|---|---|---|
| 5,054,026 A * | 10/1991 | Tsubota | ........................ | 714/53 |
| 5,187,793 A * | 2/1993 | Keith et al. | ................... | 712/225 |
| 5,390,103 A | 2/1995 | Sakakibara | | |
| 5,699,536 A | 12/1997 | Hopkins et al. | | |
| 5,812,811 A | 9/1998 | Dubey et al. | | |
| 5,951,674 A | 9/1999 | Moreno | | |
| 6,000,036 A * | 12/1999 | Durham et al. | ............... | 713/320 |
| 6,006,033 A * | 12/1999 | Heisch | ........................ | 717/158 |
| 6,263,488 B1 * | 7/2001 | Fortin et al. | ................... | 717/127 |
| 6,286,134 B1 * | 9/2001 | Click et al. | ................... | 717/138 |
| 6,356,795 B1 | 3/2002 | Barthel et al. | | |
| 6,378,124 B1 | 4/2002 | Bates et al. | | |
| 6,463,582 B1 * | 10/2002 | Lethin et al. | ................. | 717/158 |
| 6,467,052 B1 * | 10/2002 | Kaler et al. | .................... | 714/39 |
| 7,209,868 B2 * | 4/2007 | Kuo | ........................... | 702/189 |
| 2002/0032559 A1 * | 3/2002 | Hellestrand et al. | ........... | 703/22 |
| 2003/0167415 A1 * | 9/2003 | Odaohhara et al. | .......... | 713/340 |
| 2004/0230975 A1 | 11/2004 | Gewirtz et al. | | |
| 2005/0010743 A1 | 1/2005 | Tremblay et al. | | |
| 2005/0071438 A1 | 3/2005 | Liao et al. | | |
| 2005/0172277 A1 * | 8/2005 | Chheda et al. | ............... | 717/151 |
| 2006/0161762 A1 | 7/2006 | Eisen et al. | | |

OTHER PUBLICATIONS

Ebcioglu et al., Daisy: Dynamic Compilation for 100% Architectural Compatability, Proceedings of the 24th Annual International Symposium on Computer Architecture, (ISCA-97), ACM Press, pp. 26-37, 1997.

(Continued)

*Primary Examiner*—Jason Mitchell
(74) *Attorney, Agent, or Firm*—McGinn IP Law Group, PLLC

(57) ABSTRACT

A method (and apparatus) for executing a main program having a series of machine-executable instructions in one of a program binary representation and an object code representation, including establishing a first pipeline for executing the main program and establishing a second pipeline for executing a meta-program to at least one of fetch and store meta-program information of the executing of the main program and a result of an analysis of the executing the main program. The program binary representation or object code representation of the main program is not modified by establishing the second pipeline or by executing the meta-program.

20 Claims, 6 Drawing Sheets

OTHER PUBLICATIONS

Bala et al., "Dynamo: A Transparent Dynamic Optimization System", Proceedings of the 2000 ACM SIGPLAN Conference on Programming Language Design and Implementation (PLDI 2000), pp. 1-12, 2000.

Dehnert et al., "The Transmeta Code Morphing Software: Using Speculation, Recovery, and Adaptive Retranslation to Address Real-Life Challenges", Proceedings of the International Symposium on Code Generation and Optimization: Feedback-directed and Runtime, pp. 15-24, 2003.

A. Chernoff et al., "FX!32: A Profile-Directed Binary Translator", IEEE Micro., vol. 18, No. 2, pp. 56-64, Mar./Apr. 1998.

M.H. Lipasti, et al., "Exceeding the Dataflow Limit via Value Prediction", Proceedings of the 29th Annual IEEE/ACM International Symposium on Microarchitecture (Micro 29), pp. 226-237, 1996.

Marcuello et al., Speculative Multithreaded Processors, International Conference on Supercomputing, 1998, pp. 77-84.

U.S. Office Action dated Jan. 22, 2009.

Donald E. Knuth, "The Art of Computer Programming (vol. 1, Fundamental Algorithms)", ISBN: 0201896834, Addison-Wesley, Reading, MA. 3rd ed., 1997.

Hanan Samet, "Bidirectional Coroutines", Information Processing Letters, 21(1): Jul. 1-6, 1985.

Prescott New Instructions Software Developer's Guide "Next Generation Intel Processor Overview", Chapter 1, pp. 1-6, "Cpuid Extensions", Chapter II, pp. 2-12, "Instruction Set Reference", Chapter 3, pp. 3-40, "System and Application Programming Guidelines", Chapter 4, pp. 4-10, Appendix A, pp. A-1-2, and index.

Jeffrey, et al., "A Lightweight Architecture for Program Execution Monitoring", Jul. 1998, pp. 67-74.

* cited by examiner

METHOD AND APPARATUS FOR A COMPUTING SYSTEM USING META PROGRAM REPRESENTATION

BACKGROUND OF THE INVENTION

1. Field of the Invention

The present invention generally relates to processors in data processing systems and in particular to the binary (or object code) representation of programs and the way in which the binary representation is used for carrying out computation in such processors. More specifically, the invention relates to a novel binary representation of programs, and the apparatus and methods for fetching and executing the new enhanced binary representation in a processor, thereby enhancing the program's execution characteristics such as execution time, power consumption, and security.

2. Description of the Related Art

The Instruction Set Architecture (ISA) is the liaison between a program and hardware which runs the program. That is, the ISA specification defines the programmer's view of the processor and isolates the programmer from the intricacies of processor design and organization helping him or her to concentrate on developing the software. The ISA specification includes the list of instructions and their formats, number and types of registers used by the instructions, memory addressing modes, virtual memory specification, etc.

The main advantage of the layer of abstraction provided by an ISA is that the same program binaries (object code) can be executed on different physical implementations of the ISA. Conversely, the ISA abstraction gives freedom to the designer of a processor to make significant changes to the physical implementation of the processor, but still making the processor "binary compatible" to existing programs. However, the layer of abstraction provided by the ISA also has some disadvantages.

First, the ISA is often not "expressive" enough to convey the program semantics in an efficient manner. More particularly, the ISA does not do a good job of conveying compile-time/static program analysis information and run-time history information. This information can be potentially used for improving the power, performance, security and reliability of a computing system.

It is often possible to further optimize the code to make the best use of the hardware features available in a specific implementation of the processor. However, recompilation may not be possible when source code of the program is not available, affecting the performance of old binaries.

Yet another problem with the ISA is that it does not allow the program execution history information to be made available to subsequent runs of the program, thus forcing the hardware to rediscover the same information over and over again, some of which could have been avoided and thereby leading to inefficiencies.

Thus, a need exists to address some of the disadvantages of the layer of abstraction provided by the ISA. Preferably, a solution that addresses these disadvantages would also be backward compatible in that it would allow any conventional ISA-compatible machine to be able to continue to execute binary code as it currently does, should the conventional machine not be compatible with the solution for enhancement of performance by addressing current disadvantages of the ISA.

SUMMARY OF THE INVENTION

In view of the foregoing, and other, exemplary problems, drawbacks, and disadvantages of the conventional system, it is an exemplary feature of the present invention to provide a technique to enhance the execution of a main program's characteristics, such as execution time, power consumption, security, etc.

It is another exemplary feature of the present invention to provide a technique in which this benefit is achieved in a backward-compatible manner in which machines not having the hardware to take advantage of the present invention will still be able to execute a main program binary representation in the conventional manner.

It is another exemplary feature of the present invention to provide a technique in which this benefit is achieved without modifying the original main program binary representation.

It is another exemplary feature of the present invention to provide a meta-program that can be used in a variety of ways, such as preventing "hot spots" from occurring by annotating the code regions that are found to be prone to cause hot spots on a processor chip, using meta-program representation, and thereby allowing pre-emptive actions to prevent hot spots based on the previous execution history of the program.

To achieve the above exemplary features and others, in a first exemplary aspect of the present invention, described herein is a method (and apparatus) of executing a main program comprising a series of machine-executable instructions in one of a program binary representation and an object code representation, including establishing a first pipeline for executing the main program; and establishing a second pipeline for executing a meta-program to at least one of fetch and store meta-program information of the executing the main program, the meta-program information comprising at least one of an execution characteristic of the main program and a result of an analysis of the executing the main program, wherein the program binary representation or the object code representation is not modified by the establishing the second pipeline or by the executing the meta-program.

In a second exemplary aspect of the present invention, described herein is an apparatus including at least one processor and a pipeline for executing a main program using the at least one processor, the main program comprising a series of machine-executable instructions in one of a program binary representation and an object code representation, the main program including meta-program information for executing a meta-program to at least one of fetch and store meta-program information comprising at least one of an execution characteristic and a result of an analysis of the executing the main program.

In an exemplary third aspect of the present invention, also described herein is a signal-bearing medium tangibly embodying a program of machine-readable instructions executable by a digital processing apparatus to perform an execution of a main program comprising a series of machine-executable instructions in one of a program binary representation and an object code representation, the method including loading the main program and determining whether the main program includes a meta-program information for executing a meta-program to at least one of fetch and store meta-program information comprising at least one of an execution characteristic and a result of an analysis of an executing of the main program.

In an exemplary fourth aspect of the present invention, also described herein is a method of at least reducing a hot spot effect on a processor chip, the method including determining an information for one or more program steps to be executed by the processor chip, the information being related to a likelihood that the step will produce an overheating of at least an area of the processor chip.

In an exemplary fifth aspect of the present invention, also described herein is a signal-bearing medium tangibly embodying a program of machine-readable instructions executable by a digital processing apparatus for a meta-program, the meta-program comprising a series of machine-executable instructions executed as a co-routine with steps of a main program, the meta-program deriving information comprising at least one of an execution characteristic of the main program and a result of an analysis of the executing the main program.

In an exemplary sixth aspect of the present invention, also described herein is a signal-bearing medium tangibly embodying a program of machine-readable instructions executable by a digital processing apparatus to perform an execution of a main program comprising a series of machine-executable instructions in one of a program binary representation and an object code representation, the method including establishing a first pipeline for executing the main program and establishing a second pipeline for executing the meta-program, wherein the program binary representation or object code representation of the main program is not modified by the establishing the second pipeline or by the executing the meta-program.

Thus, the present invention provides a technique to enhance main program execution characteristics, such as execution time, power consumption, and security, and to provide such benefits in a backward-compatible manner, without modifying the original main program binary representation.

BRIEF DESCRIPTION OF THE DRAWINGS

The foregoing and other exemplary features, aspects and advantages will be better understood from the following detailed description of an exemplary embodiment of the invention with reference to the drawings, in which.

DETAILED DESCRIPTION OF AN EXEMPLARY EMBODIMENT OF THE INVENTION

Figure 1:
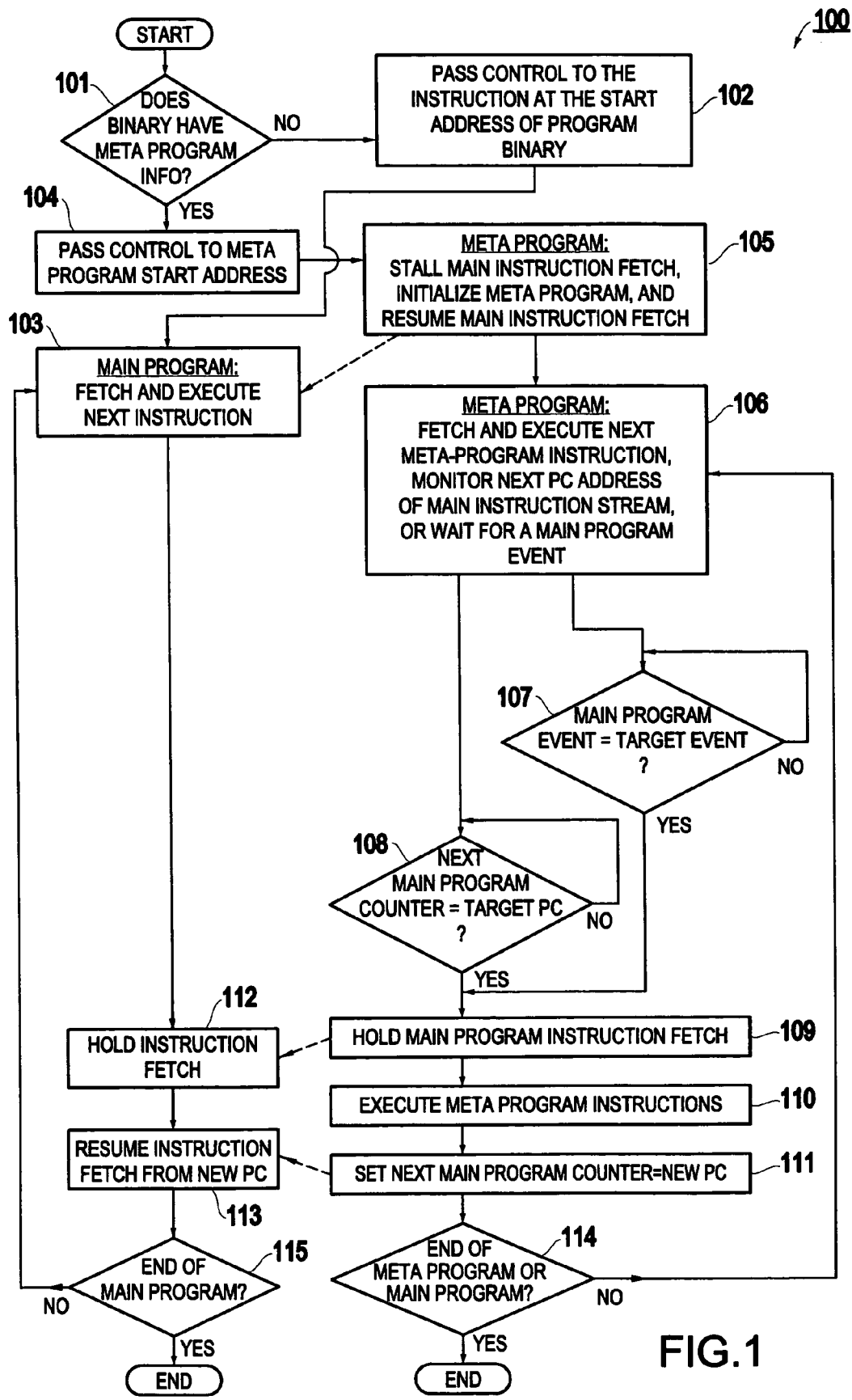
FIG. 1 shows a flowchart 100 of an exemplary embodiment of the present invention.

Referring now to the drawings, and more particularly to FIGS. 1-9, an exemplary embodiment of the present invention will now be described.

The present invention provides a solution to the above-identified problems, and others, by creating a meta-program representation that can keep information that either is not currently available or is not easily specified in the binary representation of the program. Furthermore, the present invention enables efficient storage and retrieval of history information on traditional storage (e.g., cache hierarchy and disk), instead of generating them on demand and saving them temporarily on custom storage (e.g., such as large on-chip memory, special purpose queues, etc.).

Meta-program based computation can provide the benefits that a Very Large Instruction Word (VLIW) processor can offer by exposing the implementation details of the processor to the compiler/programmer. VLIW processors (or the so-called Explicitly Parallel Instruction Computing (EPIC) architectures) try to specify some details of a specific implementation of the architecture, such as the instruction issue width and cycle-by-cycle mapping of instructions to function/execution units through the VLIW (or instruction bundle) format. This feature of the VLIW architectures constitutes their most important drawback—the binary incompatibility problem. The present invention obviates the need for such explicit encoding of architecture specific features in the binary code, but uses meta-program representation to encode the same information without modifying the original binary program.

There are several approaches to overcome the problems associated with binary incompatibility found in VLIW and other architectures. These include hardware based VLIW reorganization in I-cache, as in U.S. Pat. No. 5,951,674 to J. H. Moreno, or U.S. Pat. No. 5,699,536 to Hopkins et al., on dynamic instruction formatting (DIF) that tries to generate VLIW instructions on the fly based on execution history.

Yet another way to address the same problem is the dynamic binary translation and optimization schemes such as in DAISY (Ebcioglu et al., "DAISY: Dynamic Compilation for 100% Architectural Compatibility, Proceedings of the 24$^{th}$ Annual International Symposium on Computer Architecture, (ISCA-97), ACM Press, pp. 26-37, 1997), Dynamo (Bala et al., "Dynamo: A Transparent Dynamic Optimization System", Proceedings of the 2000 ACM SIGPLAN Conference on Programming Language Design and Implementation (PLDI 2000), pp. 1-12, 2000), and Transmeta code morphing software (Dehnert et al., "The Transmeta Code Morphing® Software: Using Speculation, Recovery, and Adaptive Retranslation to Address Real-Life Challenges", Proceedings of the International Symposium on Code Generation and Optimization: Feedback-directed and Runtime, pp. 15-24, 2003.

Interpretation and binary translation (such as the static binary translation described in A. Chernoff et al., "FX!32: A Profile-Directed Binary Translator", IEEE Micro, Vol. 18, No. 2, pp. 56-64, March/April, 1998, or dynamic binary translation as in DAISY/Transmeta/Dynamo) techniques, DIF (Nair et al.) and instruction cracking as in Intel Pentium-Pro processors, all use the run-time information and attempt to improve the performance of a processor.

However, all these prior art techniques differ from the meta-program representation based computing in at least the following fundamental aspects:

1) ability to dynamically save/restore/augment run-time history information;

2) separating ISA-level program specification from meta-information; and 3) ability to effectively keep different versions of a binary without modifying the source code, binary, or ISA-level program specification (instead of re-compilation as in profile-directed feedback and FX!32 schemes).

In addition to the above, the meta-program based computing, as described in the present invention, does not suffer from the slowdown due to interleaving translation/interpretation/optimization and execution phases in conventional techniques. The present invention facilitates computation look-ahead beyond any of the conventional techniques described above can possibly achieve.

Profile-directed feedback (PDF) is a compilation technique in which the program is optimized along the frequently executed paths that are identified based on the execution profiles collected, using "representative" or "training" inputs. The fundamental assumption in PDF is that one version of the optimized binary will perform well even for the input sets that are unknown, which often is not true in reality.

The present invention can overcome all the drawbacks of PDF arising from its non-adaptive nature. Moreover, the meta-program based computing can adapt to new input sets without recompiling the source code of a program, and therefore can optimize a program, even if the source code is not available.

The limited encoding and expansion opportunities provided by instruction set architectures (ISA) limit the amount of information that can be conveyed through program binaries to data processing hardware. Therefore, it may not be possible to "enhance" the ISA and thereby convey more information via program binaries.

The present invention describes a program representation called "meta-program representation", which allows augmentation of program binaries with a variety of information that may be used by data processors to improve the program's execution characteristics such as execution time, power consumption, and security.

The meta-program execution model described herein provides a way by which unmodified program binaries can make use of the meta-program information, thus alleviating all the above-identified binary compatibility issues. The following description provides the techniques to generate, encode and efficiently use meta-program information, as well as techniques to build a data processing system that can use meta-program information. Several applications of meta-program representations in the uniprocessor and multiprocessor computing systems are also described.

A key feature that is exploited in the exemplary embodiment is how to combine the program specification at ISA-level and the program's run-time characteristics without mixing them together, so that the resulting binary (or object code) program representation can be made portable across different implementations of an instruction set architecture.

Traditional program binary includes sequences of instructions specifying the data and control flow information. The present invention specifies a meta-program representation that can save and update a lot of information along with the traditional program binary, which are potentially useful for improving the power and performance of a computing system. The meta-program can help maintain multiple versions of the program based on various criteria specific to a run-time environment.

In particular, the present invention can help avoid the need for generating and keeping multiple copies of the same program's binary, where each copy is optimized for a specific run-time environment. Moreover, the present invention provides a technique for efficient storage and retrieval of large history information on traditional storage, thus eliminating the need for large, expensive and under-utilized on-chip custom storage arrays, and thereby efficiently exploits the temporal and spatial localities in program behavior.

For purpose of the following discussion, the term "meta-program information" may be defined as any information that would help to modify the execution behavior of a given program. Meta-program information may contain both data and executable code, which may or may not use the instruction set architecture of the target processor for which programs are compiled. For example, branch history, data value reuse patterns, exception behavior, or any data that can influence the control and data flow of a program, can be part of meta-program information.

Therefore, a meta-program includes a set of meta-program instructions that can modify the execution behavior of a program binary during its run-time. However, as will be explained below, the meta-program by itself does not have a totally independent control flow. Rather, it follows the control flow of the program binary in a transparent manner. In this respect, the meta-program runs as a concurrent co-routine with the binary code of the main program, rather than as a supervisory program.

Examples of executable meta-program information include instructions for pre-fetching either data or program binary, instructions for updating or initializing prediction/history tables, instructions for comparing data and changing the control flow of meta-program. Some specific meta-program instructions that are essential for meta-program computing are described later. A meta-program needs its own stack, usually in the protected memory space used by the operating system (OS).

Some additional hardware is needed to use the meta-program information, as described below. However, if the computing system (processor, OS, etc.) is not capable of using the meta-program information available in the binary representation of the program, it can just ignore the additional information and run the program using the information specified by the instructions. On the other hand, if the computing system is meta-program-aware, it can use the meta-program information, and also augment the meta-program information based on the current execution history. Thus, the exemplary embodiment of the present invention is backward-compatible to conventional machines and capabilities.

FIG. 1 shows an exemplary flowchart 100 that demonstrates the concepts of the present invention. It should be noted how the left side of the flowchart (e.g., steps 101, 103, 104, etc.) generally applies to the traditional binary program aspects and the right side (e.g., steps 105, 106, etc.) reflects activity in the meta-program of the present invention.

In a traditional data processing system, a supervisory program such as the loader 503 module of the OS software (e.g., see FIG. 5), loads a program binary for execution from disk into the memory. The loader also makes necessary changes to the loaded binary image such as dynamically linking library routines, relocating some of the address references in the program, etc., prior to passing control to the first instruction (or the entry point) of the program.

In a meta-program based computing system, the loader module 503, in addition to the above-mentioned tasks, in step 101 checks whether any meta-program information is associated with the program binary prior to passing control to the first instruction of the program in steps 102 and 103.

If the binary has any associated meta-program information (e.g., a "YES" in step 101) then, in step 104, the instruction fetch of the main pipeline is temporarily stopped and the loader passes control to the meta-program first in step 105, thereby activating the meta-program execution mode.

From that point onwards, the meta-program monitors and sometimes modifies the execution of the program as shown in steps 106-111. If a meta-program is exploiting some specific hardware implementation features of an ISA, it may not function on a different implementation of the same ISA. Therefore, it may be necessary to check whether the meta-program associated with a binary is compatible with the hardware implementation prior to execution in step 101.

The hardware structures needed to support the meta-program execution model described above in a typical processor will now be described by reference to FIG. 2. As shown by the exemplary configuration 200, at the core of a meta-program-based computer are two processing pipelines 201,202 working in tandem. The diagram is for illustration purposes only; for example, the processor pipelines shown in the FIG. 2 may have additional stages. Moreover, each one of the pipeline stages 201,202 may be further pipelined and implemented as a number of stages determined by the clock frequency requirement of the processor.

The main pipeline 201 is used for processing instructions in the traditional binary programs compiled for the instruction set architecture of the processor. The meta-program information is processed by a separate pipeline, henceforth referred to as meta-program pipeline 202, which can fetch and process meta-program instructions and data. The main pipeline 201 is an enhanced version of the pipeline structures used by contemporary microprocessors, as enhanced for interacting with the meta-program pipeline 202.

Figure 2:
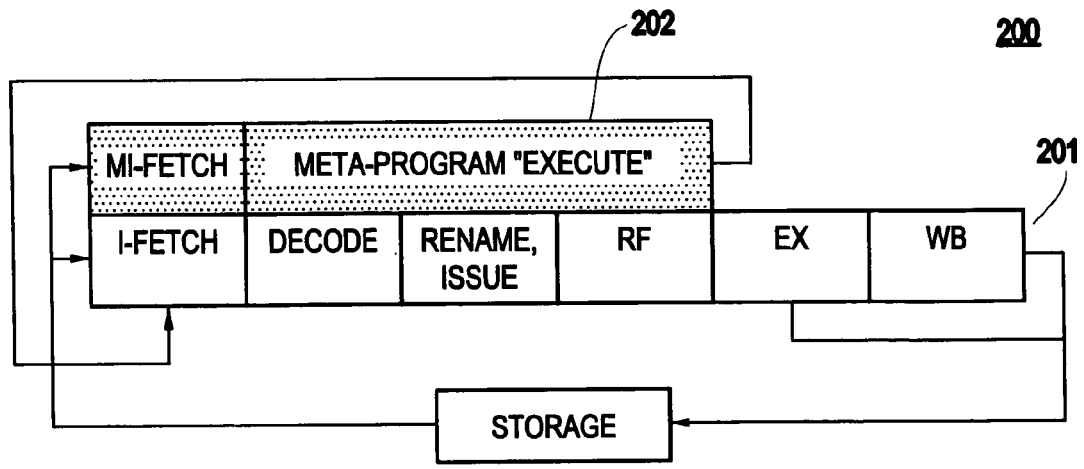
FIG. 2 illustrates a diagram 200 for main program and meta-program pipelines 201, 202, respectively.
Figure 3:
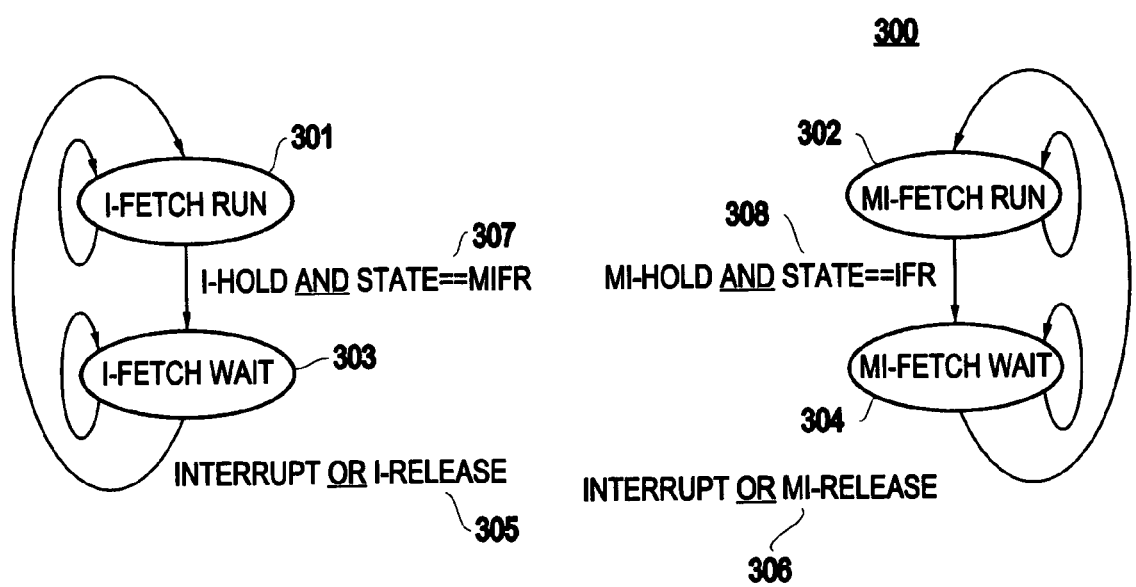
FIG. 3 illustrates an exemplary simplified processor state transition diagram 300 for the present invention.

Referring to FIG. 2, the I-fetch stage performs the fetching of instructions from the main program binary, whereas MI-fetch stage performs the fetching of meta-program instructions corresponding to the meta-program information associated with the binary. The decode stage performs the decoding of instruction(s), and the renaming and issue stage(s) of the pipeline perform the register renaming of instruction operands (optional) and issuing of instructions to function units. The RF (register fetch) stage brings in the required data for computation from register files. The EX or execute stage performs the actual operations specified by the instruction (such as an addition or multiplication operation, or accessing the cache/memory) and the WB or write-back stage moves data back to be used again into the bypass network interconnecting other stages (not shown in FIG. 2), and to the storage (register file or the cache as specified by the instruction).

The meta-program "execute" stage may include a number of stages similar to the main pipeline stages. The meta-program instructions may also change next main program instruction address used by the IF stage as shown by the data path in FIG. 2. Because meta-program instructions are functionally similar to traditional instructions, those skilled in the art are well aware of techniques for constructing such processing pipelines to execute meta-program instructions at the required pipeline clock frequency.

In addition to processing meta-program information, the meta-program pipeline 202 can also monitor various stages of the main pipeline, as shown by steps 107 and 108 in FIG. 1. As shown by the simplified processor state transition diagram 300 in FIG. 3, the two concurrently executing pipelines 201, 202 can be in any one of the two states during meta-program computing mode, in addition to other states (such as stall, etc.) each pipeline can possibly be in during its traditional execution mode.

The two states of main pipeline 201 are I-fetch-Run (IFR) 301 and I-fetch-Wait (IFW) 303 and that of meta-program pipeline 202 are MI-fetch-Run (MIFR) 302 and MI-fetch-Wait (MFFW) 304. The states IFR 301 and MIFR 302 may be considered as an aggregation of all other states the respective pipelines can be in, such as the stall state arising from a cache/TLB (Translation Look-aside Buffer) miss, etc. When the pipeline is in the Wait state (IFW or MFFW) 303, 304 the corresponding fetch engine is halted (i.e., no new instructions or meta-program instructions are fetched).

Only an interrupt or one of the signals (I-release or MI-release) 305, 306 can force a state transition from Wait to Run (IFR or MIFR). In the case of an interrupt, upon exiting from the interrupt service routine, the fetch stage of the corresponding pipeline goes back to the Wait state (or to any other state the pipeline was in prior to interrupt) when the interrupted state is restored. The transition from Run to Wait state takes place only when both the corresponding hold (I-hold or MI-hold) signal is active and the other pipeline is in the Run state, as indicated by the AND expressions 307, 308. This ensures that mutual blocking of pipelines leading to a deadlock condition is not possible by design.

The I-hold signal is usually activated by the meta-program instruction called Halt Instruction Fetch (HIF). The I-release signal is usually activated by the meta-program instructions such as Resume Instruction Fetch (RIF) and Swap program counter (SPC). Referring to the meta-program pipeline, the MI-hold signal is often activated by the Wait for Program Counter (WPC) instruction upon waiting for instruction fetch from one or more specific instruction addresses specified by WPC instruction. The MI-release signal is activated when an address match is found for the PC address specified by the WPC instruction.

The meta-program associated with a program binary may also be activated by events other than a control flow change, as shown by step 107 in FIG. 1. For example, a long latency event such as a cache miss can trigger an associated meta-program for that event which can save the current architected state, speculatively execute a region of code, and merge the results of speculative execution after servicing the cache miss. Such events may be associated with a specific instruction, or a region that can cause the event.

In a processor implementation that supports multi-threaded execution (for example, simultaneous multi-threading), instead of waiting in the I-fetch Wait state, or speculatively executing code from the same thread, another ready thread can be run. Therefore, a combination of speculative, look-ahead and multi-threaded execution is thus possible on a meta program representation based computing system. Meta program information can be used for dynamically selecting the best execution strategy, especially in the event driven execution.

The meta-program instruction set may contain the following instructions and/or instruction types:
Halt Instruction Fetch (HIF)
Wait for Program Counter (WPC)
Resume Instruction Fetch (RIF)
Swap program counter (SPC)
Update table with Data (UTD)
Data Compare instructions (macro and traditional)
Branching instructions (conditional and unconditional)

Reading and writing data to the register file or cache/memory

In addition to the above, the meta-program might also execute any instructions of the main pipeline. A meta-program may, therefore, use the instructions of the main pipeline to perform some of the operations listed above. The meta-program instructions, its operands and its encoding/format may vary across different physical implementations of the instruction set architecture used by the binary program.

The meta-program is usually executed in the protected mode similar to an OS, and it can only be modified by a program running in the protected/supervisory mode. Therefore, a meta-program cannot be modified by a user code during execution, thereby providing a secure computing environment taking advantage of the existing protection mechanisms available in the computing system. Various OS run-time support modules such as a loader, dispatcher and context save/restore may also have associated meta-program for implementing the functions to manage multiple meta-program contexts in a multi-processor, multi-tasking operating system.

Figure 4:
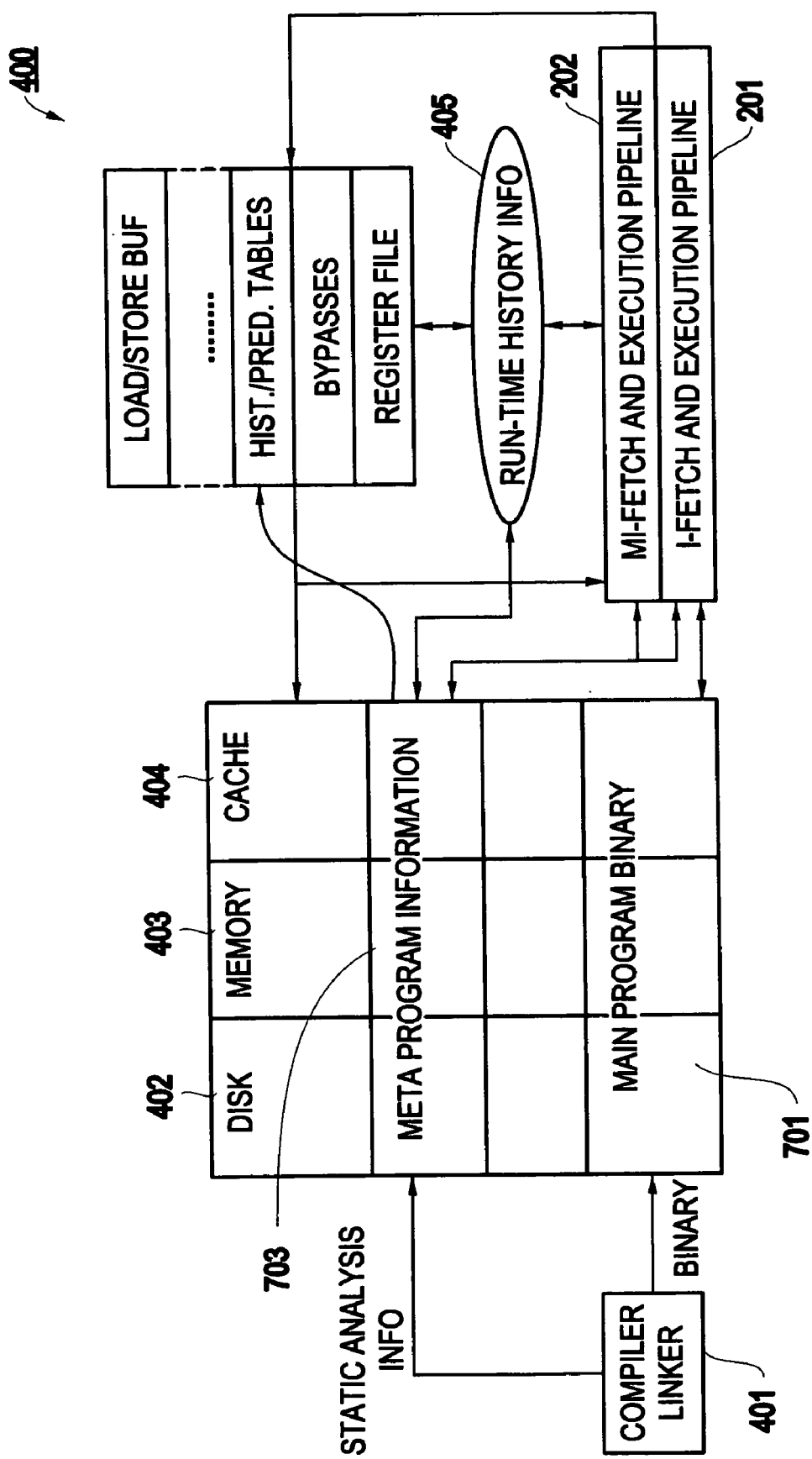
FIG. 4 shows a block diagram 400 of an exemplary data processor using meta-program representations.

FIG. 4 shows an exemplary data processor 400 configured to implement the present invention. Referring to FIG. 4, a compiler 401 generates an object file by compiling a source file written in a high-level language such as C. A linker 401 produces a relocatable executable binary file, often combining a number of separately compiled files/modules of a source program. Some of the references made by a program binary, such as system calls and library routines, may be dynamically liked at the execution time and are loaded into memory for execution by the loader module 503 of the operating system (see FIG. 5).

In a traditional computing system, during the execution of a program, the binary program 701 is loaded into the memory including a main memory 403 and cache hierarchy 404 from the disk storage 402. The instructions and data specified in the binary program is fetched from memory and executed by the main pipeline 201 of the processor. In contemporary processors, a small fraction of the run-time history information 405 is cached in various tables and used for improving performance by exploiting the temporal and spatial locality behaviors exhibited by the programs.

In a meta-program based computing system, the meta-program information 703 associated with the program binary is also loaded and executed. Some of the useful run-time history information and the static program analysis information generated by the compiler 401 are used for generating meta-program information by a monitor program 502 run by the OS either concurrently during the execution of the program or off-line when the computer is relatively free/idle. The meta-program information is updated throughout the lifetime of a program binary, often triggered by changes in input data set characteristics and processor hardware implementations.

Interrupts/exceptions are serviced by both the main pipeline 201 and meta-program pipeline 202. The states of both pipelines are saved first before switching to interrupt service routine. The meta-program corresponding to the interrupt service routine is executed, if such a program exists. Self-modifying code usually does not have a meta-program associated with it. Meta-program may try to execute portions of main program binary speculatively. All the speculative results will be written to a set of non-architected registers.

Any operand (and therefore the register used by the operand) of an instruction may be specified as non-architected. Any exceptions arising from the speculative execution will set an exception bit associated with the instruction and the exceptions will be taken only when code becomes non-speculative. If there are no exception conditions during speculative execution, then the non-architected registers used by the speculative code will be copied to architected registers in the program order.

Figure 5:
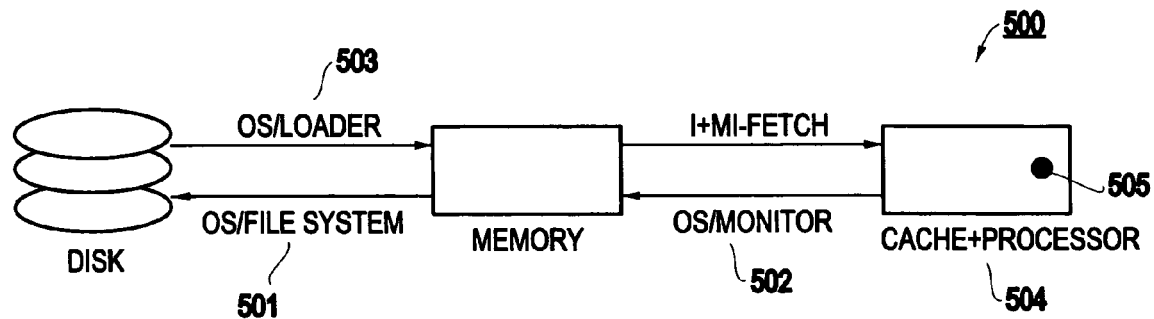
FIG. 5 shows a flowchart 500 of meta-program information storage and retrieval.

FIG. 5 shows an exemplary meta-program information storage and retrieval technique 500. The meta-program information may be created and updated in a number of ways. Program source-level information extracted at compile-time such as variable type information, live-range information, memory alias analysis information, call parameter list information, etc., may be stored along with the binary by the compiler/linker. Run-time history information 405 collected by a program monitoring thread/routine may also be stored as meta-program information. The updates in meta-program information associated with a binary may be done off-line after the completion of program execution by a "monitor" program 502 using OS file system services 501 as shown in FIG. 5.

The meta-program representation may be used for implementing various levels of secure computing environments as well, by annotating the whole program or regions of it with "authentication tags". Link-time analysis can provide the list of valid addresses, such as a start address of subroutines, a region of code can normally branch to. This information may be used by the meta-program to determine any program control flow changes not intended by the programmer, such as flow changes due to a computer virus. Furthermore, meta-program information may be used for comparing the results of computation at the macro-level to detect transient faults and to efficiently implement redundancy based fault-tolerance.

Computing based on a meta-program can help improve the performance of traditional data processing systems in a number of ways, as follows. Data value prediction, proposed by Lipasti and Shen (Lipasti, et al., "Exceeding the Dataflow Limit Via Value Prediction", Proceedings of the 29$^{th}$ Annual IEEE/ACM International Symposium on Microarchitecture (MICRO 29), pp. 226-237, 1996) is a conventional technique to speed up the computation by predicting the results of executing certain types of instructions such as load instructions based on results produced by those instructions for the same input values. This conventional technique can potentially reduce the power consumption and execution time of a program.

However, applying this technique on a multiprocessor system can result in incorrect execution behavior because of the following reasons:

1) all the load and store instructions accessing shared memory locations in a multiprocessor system must be made visible to other processors in order for the coherency logic to perform correctly and to avoid dead-locks, and 2) all the load and store instructions accessing memory mapped I/O locations should be executed even if the data values produced by those instructions can be predicted.

For an existing instruction set architecture, it is impossible to convey the necessary information to distinguish between above-mentioned types of load/store instructions so that the processor can selectively use value prediction to those instruction groups that are "safe" to predict.

Using the method and apparatus of the present invention, those instruction groups that are not amenable to data value prediction can be marked by simply annotating the binary, using compile-time and run-time information, by looking at the history of the target memory address of the load/store instructions. The resulting meta-program information can be used by the processor to selectively disable data value prediction on such instructions/groups of instructions.

Macro data value prediction is another scheme based on the present invention that can further improve the traditional data value prediction technique. Often some variables in a program can be invariant for a wide range of input data because they are either derivatives of compile-time constants or the outcome of some of the computations are the same most of the time.

Run-time history information can be used to identify such regions of the code and store the most frequent input and output data values for such regions. This can potentially eliminate the computation of a set of data values, as well as the need for large data value history tables required by the traditional data value prediction hardware. The meta-program compares the set of input values residing in registers/memory at the beginning of a region of code to be replaced with macro-value prediction technique.

If all the inputs match with frequently used inputs, then the main program instruction fetch is temporarily halted, and the expected results of computation by the region of code that was replaced is loaded into registers, and then the program counter is loaded with the appropriate exit point of the region, thereby resuming the instruction fetch and execution effectively skipping a region of code.

Out-of-order execution processors can effectively extract more instruction-level parallelism from binary programs at run-time, using techniques such as renaming architected registers to a larger set of physical registers and out-of-order execution of renamed instructions. The meta-program information can be used for providing a larger "virtual set" of non-architected registers to the program binary, which may be as large as the number of physical registers in the implementation. This would be useful for improving the performance of binaries on an in-order processor, which has more physical registers than the architected registers.

The idea is based on using an indirect register mapping table specified to the hardware. In order to use the same binary encoding (for backward compatibility and portability across different implementation of ISA) all the register operands must be specified using the same number of bits, for example, 5 bits to address 32 architected registers.

However, using a few extra "annotation bits", one could specify which operands are using the non-architected registers. This would enable reordering of the instructions in the old binary limited only by the true data dependencies and number of physical registers in the processor.

The meta-program of the present invention can be used to execute portions of the main program binary speculatively. For example, load instructions may be moved above branches for speculative execution. The results of a speculative instruction will be written to non-architected registers. Any operand (and therefore the register mapped to the operand) of an instruction may be specified as non-architected using the meta-program associated with it. Any exception arising from the speculative execution sets an exception bit in the meta-information associated with the instruction, instead of taking the exception.

The exceptions are taken only when code becomes non-speculative, and at that point, the speculatively executed instruction will be executed again, causing the exception to happen in the program order. A detailed description of this conventional technique for dealing with speculative instructions in the dynamic binary translation context may be found in publications such as the above-mentioned 1997 ISCA conference paper by Ebcioglu et al.

The meta-program of the present invention can change the program control flow, as well as save and reuse large amounts of branch history information. Therefore, it can predict branch target addresses and branch outcome with very high accuracies. It can also mark hard-to-predict branches that do not follow any predictable execution patterns, so that the processor may use multi-path execution until the branch outcome is resolved. Similarly, better data and instruction cache pre-fetching can be done using meta-program using the history information from both current and previous runs of the program.

Figure 6:
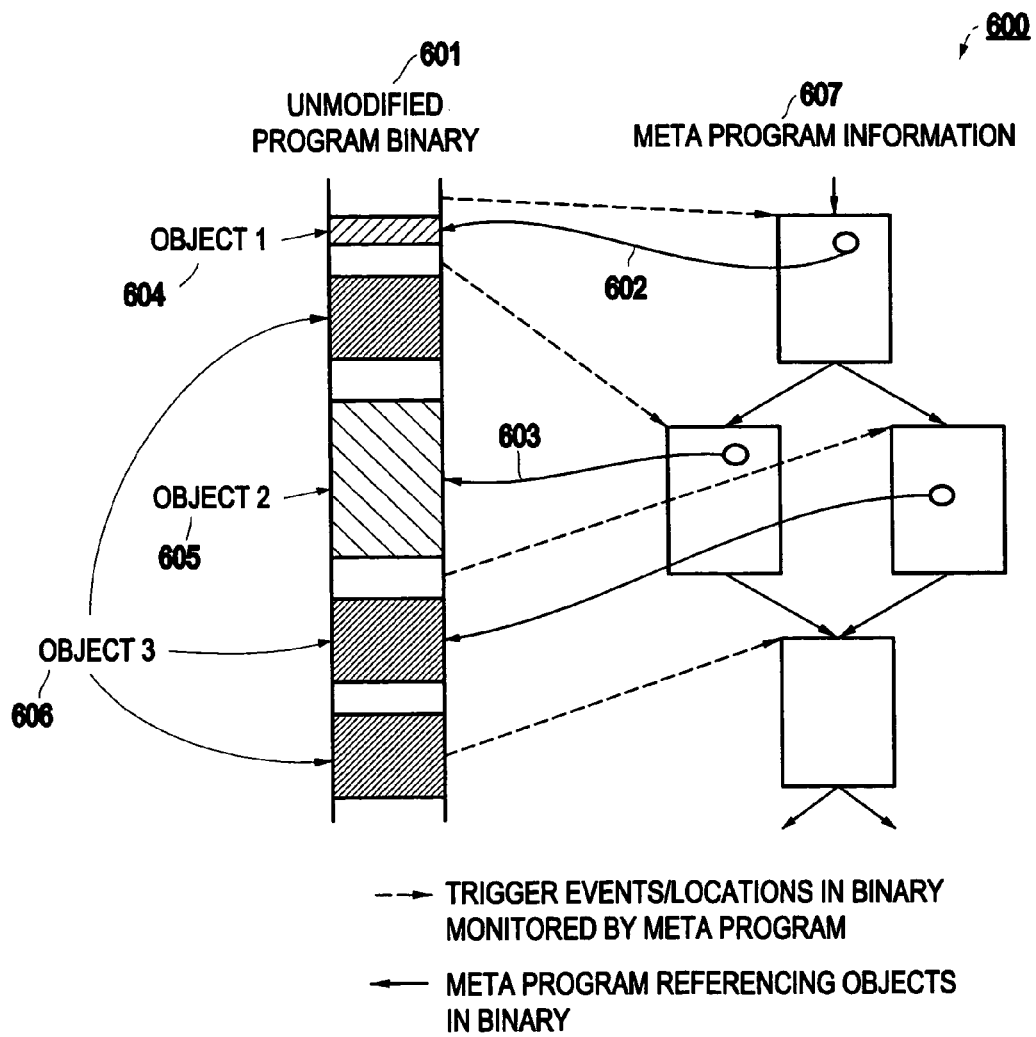
FIG. 6 shows an example 600 of how meta-program information can be added to a program binary without making changes to the program binary.
Figure 7:
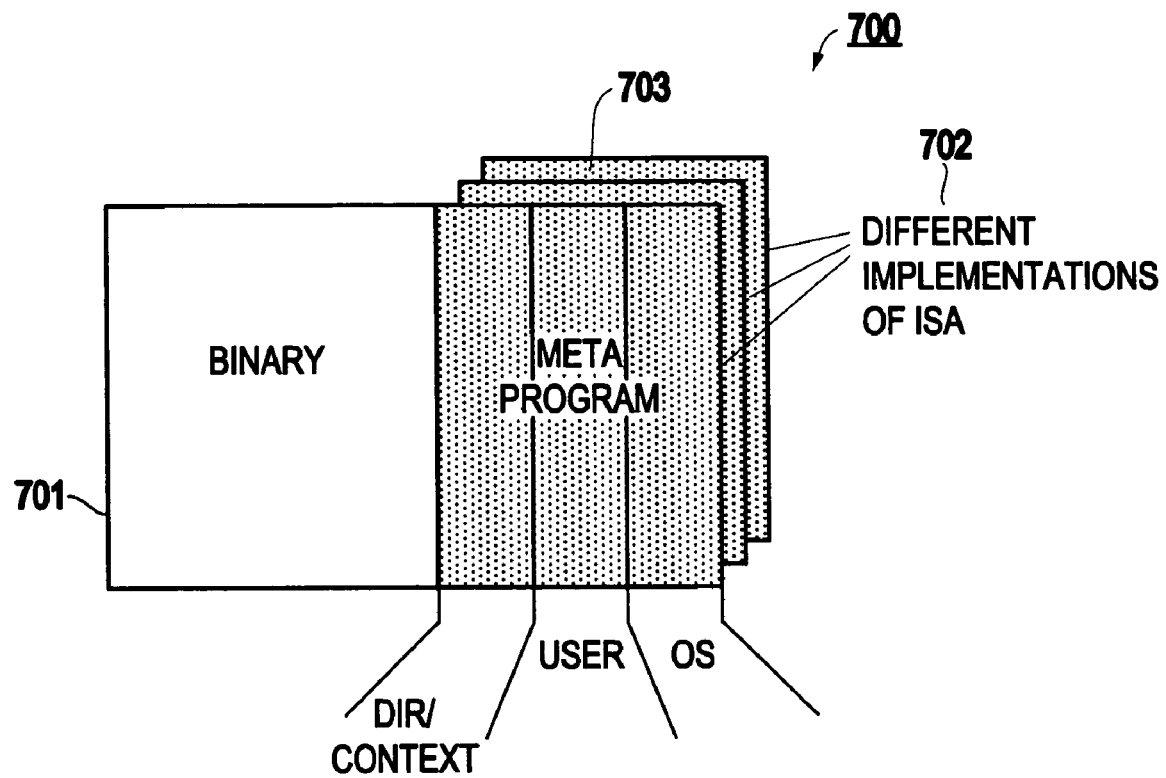
FIG. 7 shows an example 700 of meta-program information representation and sharing.
Figure 9:
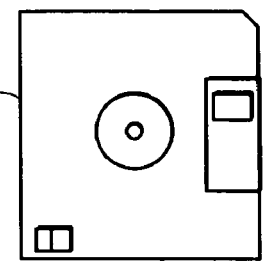
FIG. 9 illustrates a signal bearing medium 900 (e.g., storage medium) for storing steps of a program of a method according to the present invention.

Meta-program information can be added to a program binary without making any changes to the binary as shown by the diagram 600 in FIG. 6. Any typical binary representation of a program 601 includes sequences of ISA instructions implicitly encoding the control and data flow information, with an optional header (containing information such as pointers to locations that need address relocation) for the loader module 503 of the operating system (OS).

The contents of such a traditional binary representation 601 may be considered a collection of objects 604,605,606 for the purpose of adding meta-program information. For example, an object 604 in a program binary can be a region of code corresponding to one or more functions/procedures, instructions belonging to one or more frequently executed regions (traces), instructions belonging to one or more basic blocks, or one or more instructions that may or may not be contiguous.

A number of such objects 604,605,606 are shown in FIG. 6. The traditional program binary representation 601 may be extended by adding "pointers" 602, 603 to the objects 604, 605 in it from the meta-program information 607. Such unique pointers can be constructed to objects in a file by specifying one or more offsets to specific locations where the elements of an object in the binary file is residing.

The meta-information is saved along with the binary on disk. The meta-program information during the execution of a program, however may be stored and shared at different levels of run-time environment such as OS, user and execution scenarios such as a "project" dealing with a specific input data set, etc. as shown in the meta-program information representation of FIG. 7. The meta-program loader module 503 of the OS, in addition to the traditional tasks involved in loading and executing any program, loads the binary representation 701 containing the meta-program information 703 as well to the appropriate level of data hierarchy 702 in the architecture where the meta-program information 703 is most likely to be used.

The meta-program information 703 can be specified at different levels of granularity: the register-level, instruction-level, basic-block level, or a group of basic-blocks, such as a trace segment or tree-region of code. In fact, a combination of all the above levels of granularity would be optimum to cover a wide range of program run-time behavior. Certain types of meta-program information may be relevant only for a specific implementation of the ISA and such hardware specific meta-program information shall be marked and stored separately.

Localized heating and the resulting "hot spot" is predicted to be one of the prominent causes for failure in semiconductor processor chips. Hot spots due to the execution of a specific sequence of instructions and the resulting over utilization of circuits can be detected by monitoring the output of on-chip temperature monitors, and the potential permanent damage to the chip can be prevented by slowing down the execution of program or by other techniques.

A meta-program-based computing system can prevent hot spots from occurring by annotating the code regions that are found to be prone to hot spots using meta-program representation. The meta-program pipeline, using the meta-program information can therefore take pre-emptive actions to prevent hot spots based on the previous execution history of the program.

Thus, as an example of implementing this aspect of the present invention, the cache/processor 504 exemplarily shown in FIG. 5 would have one or more temperature sensing devices 505 embedded in the processor architecture to provide temperature feedback for purpose of the "hot-spot-prevention" aspect of the present invention.

Figure 8:
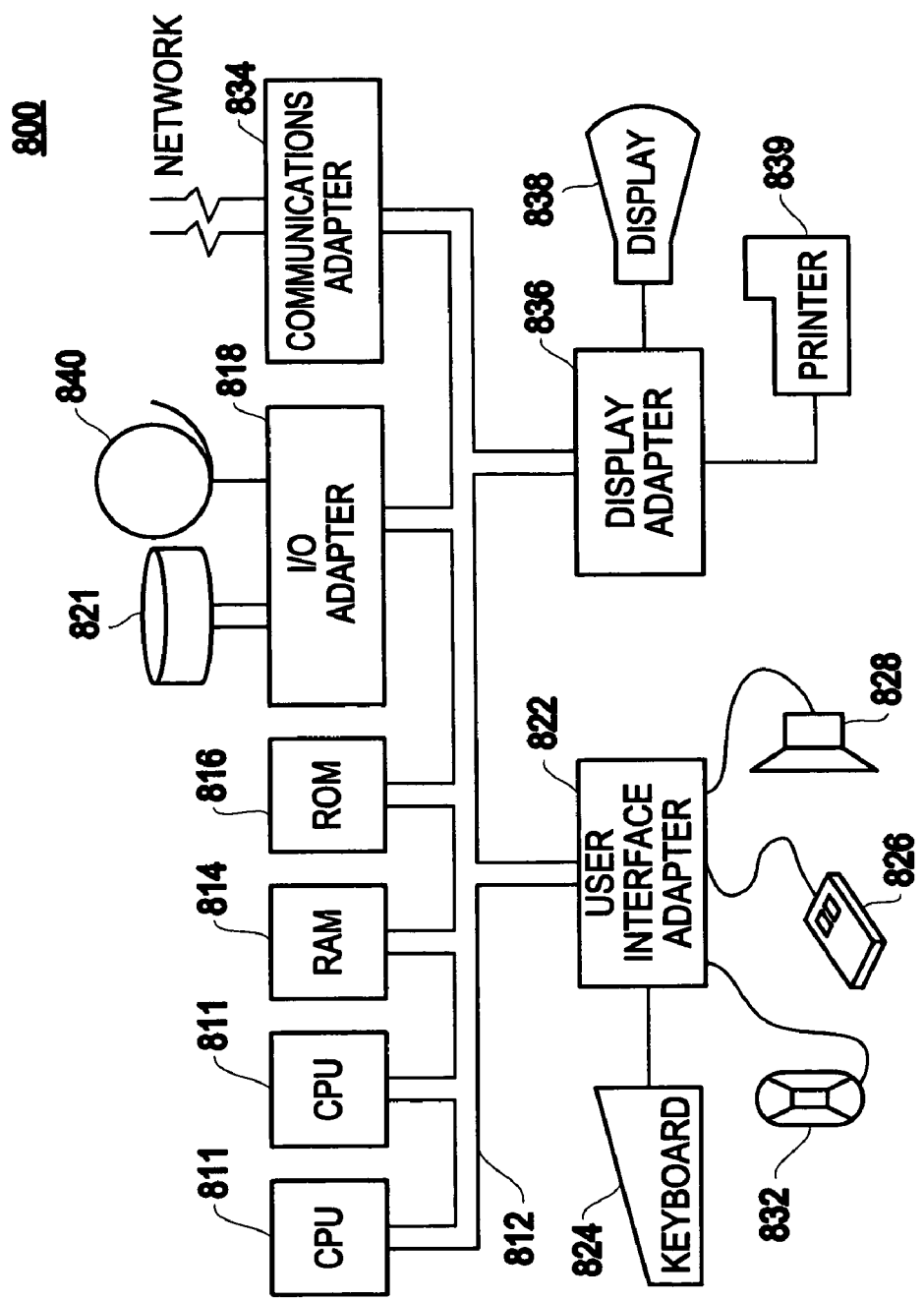
FIG. 8 illustrates an exemplary hardware/information handling system 800 for incorporating the present invention therein.

FIG. 8 illustrates a typical hardware configuration of an information handling/ computer system in accordance with the invention and which preferably has at least one processor or central processing unit (CPU) 811.

The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions, including meta-program instructions, executable by a digital data processor incorporating the CPU 811 and hardware above, to perform the method of the invention.

This signal-bearing storage media may include, for example, a RAM contained within the CPU 811, as represented by the fast-access storage for example. Alternatively, the instructions may be contained in another signal-bearing storage media, such as a magnetic data storage diskette 900 (FIG. 9), directly or indirectly accessible by the CPU 811.

Whether contained in the diskette 900, the computer/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media.

While the invention has been described in terms of exemplary embodiments, those skilled in the art will recognize that the invention can be practiced with modification within the spirit and scope of the appended claims.

Further, it is noted that Applicants' intent is to encompass equivalents of all claim elements, even if amended later during prosecution.

Having thus described our invention, what I claim as new and desire to secure by Letters Patent is as follows:

1. A computer implemented method of executing a main program comprising a series of machine-executable instructions in one of a program binary representation and an object code representation, said method comprising:
 establishing a first pipeline for executing said main program; and
 establishing a second pipeline capable of executing, as a co-routine, a meta-program associated with the main program to fetch and store meta-program information of said executing main program, said meta-program information comprising at least one of an execution characteristic of said main program and a result of an analysis of said executing said main program, said meta-program performing the steps of:
  executing a monitoring instruction, the monitoring instruction monitoring one of a program counter of said main program to determine if a target program counter has been reached, and events in said main program to determine if a target event has occurred,
  generating a hold command for a main program instruction fetch if said target program counter or said target event is detected;
  executing one or more meta-program instructions;
  setting a new program counter for said main program; and
  resuming execution of said main program at said new program counter,
 wherein said one of said program binary representation and said object code representation is not modified by said establishing said second pipeline or by said executing said meta-program.

2. The method of claim 1, wherein said analysis of said main program comprises at least one of:
 a compile/link-time static analysis of said main program; and
 an analysis of meta-program information obtained during said executing said main program.

3. The method of claim 1, further comprising:
 using said meta-program information to at least one of improve an execution performance, reduce a power consumption, and enhance a security of said executing said computer program.

4. The method of claim 1, further comprising:
 loading said main program from the binary file generated by a linker; and
 determining whether said main program is associated with a meta-program information.

5. The method of claim 1, wherein said second pipeline comprises at least one hardware component of a processor executing said main program that is a component unnecessary for executing said main program.

6. The method of claim 1, wherein said meta-program instructions comprise:
 a method of macro data value prediction that predicts a computation results of a region of code.

7. The method of claim 6, further comprising:
 using said macro data value predication to at least one of reduce power consumed by a processor executing said main program and an execution time of a program.

8. The method of claim 1, wherein said meta-program instructions comprise:
 annotating instructions of said program binary without modifying said program binary.

9. The method of claim 8, wherein the annotated instructions provide information to a processor processing said main program regarding a shared-memory usage of instructions of said main program, and using the said information to speed-up multi-processor programs by controlling speculative execution of said main program execution.

10. The method of claim 1, wherein said meta-program instructions comprise:
   using meta-program information to detect an abnormal behavior of said executing said main program.

11. The method of claim 10, wherein said abnormal behavior results from a program taking control over said executing said main program.

12. The method of claim 1, wherein said meta-program instructions comprise:
   using meta-program information to specify more registers for speeding-up said executing said main program by avoiding spilling and instruction reordering.

13. The method of claim 1, wherein said meta-program instructions comprise:
   performing speculative, out-of-order, execution of regions of code in said main program.

14. An apparatus, comprising:
   at least one processor; and
   a first pipeline for executing a main program using said at least one processor, said main program comprising a series of machine-executable instructions in one of a program binary representation and an object code representation;
   said main program and an associated meta-program capable of fetching and storing meta-program information comprising at least one of an execution characteristic and a result of an analysis of said executing said main program; and
   a second pipeline capable of executing said meta-program, said meta-program performing the steps of:
      executing a monitoring instruction, the monitoring instruction monitoring one of a program counter of said main program to determine if a target program counter has been reached, and events in said main program to determine if a target event has occurred,
      generating a hold command for a main program instruction fetch if said target program counter or said target event is detected;
      executing one or more meta-program instructions;
      setting a new program counter for said main program; and
      resuming execution of said main program at said new program counter;
   wherein instructions executed by said first pipeline and said second pipeline operate as co-routines.

15. The apparatus of claim 14, wherein said analysis of said main program comprises at least one of:
   a compile/link-time static analysis of said main program; and
   an analysis of said meta-program information obtained during an execution of said main program.

16. The apparatus of claim 14, wherein said second pipeline comprises at least one hardware component additional to hardware components of said first pipeline.

17. The apparatus of claim 14, wherein said specialized meta-program instructions comprise one or more of:
   a Halt Instruction Fetch (HIF) instruction;
   a Wait for Program Counter (WPC) instruction;
   a Resume Instruction Fetch (RIF) instruction;
   a Swap Program Counter (SPC) instruction;
   an Update table with Data (UTD) instruction;
   Data Compare instructions (macro and traditional);
   Branching instructions (conditional and unconditional); and
   Reading and writing data to a register file or to a cache or memory.

18. The apparatus of claim 14, wherein said meta-program pipeline can selectively execute any instructions of the main pipeline.

19. A signal-bearing storage medium tangibly embodying a program of machine-readable instructions executable by a digital processing apparatus to perform an execution of a main program comprising a series of machine-executable instructions in one of a program binary representation and an object code representation, said method comprising:
   loading said main program; and
   determining whether said main program is associated with a meta-program co-routine to fetch and store meta-program information comprising at least one of an execution characteristic and a result of an analysis of an executing of said main program;
   establishing a first pipeline for executing said main program; and
   a second pipeline for executing said meta-program, said meta-program performing the steps of:
      executing a monitoring instruction, the monitoring instruction monitoring one of a program counter of said main program to determine if a target program counter has been reached, and events in said main program to determine if a target event has occurred,
      generating a hold command for a main program instruction fetch if said target program counter or said target event is detected;
      executing one or more meta-program instructions;
      setting a new program counter for said main program; and
      resuming execution of said main program at said new program counter.

20. The signal-bearing storage medium of claim 19, said method further comprising:
   wherein said program binary representation or object code representation of said main program is not modified by said establishing said second pipeline, said second pipeline not established for purpose of avoiding modification to said program binary representation or object code representation.

* * * * *

UNITED STATES PATENT AND TRADEMARK OFFICE
CERTIFICATE OF CORRECTION

PATENT NO. : 7,665,070 B2 Page 1 of 1
APPLICATION NO. : 10/829989
DATED : February 16, 2010
INVENTOR(S) : Krishnan Kunjunny Kailas It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1498 days.

Signed and Sealed this

Twenty-eighth Day of December, 2010

David J. Kappos
*Director of the United States Patent and Trademark Office*